United States Patent
Van Den Berg

(10) Patent No.: US 8,527,191 B2
(45) Date of Patent: Sep. 3, 2013

(54) UNMANNED VEHICLE FOR DISPLACING MANURE

(75) Inventor: Karel Van Den Berg, Bleskensgraaf (NL)

(73) Assignee: Lely Patent N.V., Maassluis (NL)

( * ) Notice: Subject to any disclaimer, the term of this patent is extended or adjusted under 35 U.S.C. 154(b) by 993 days.

(21) Appl. No.: 12/566,728

(22) Filed: Sep. 25, 2009

(65) Prior Publication Data

US 2010/0076641 A1 Mar. 25, 2010

(30) Foreign Application Priority Data

Sep. 25, 2008 (NL) ...................................... 1035980

(51) Int. Cl.
*G01C 22/00* (2006.01)
*G05D 1/00* (2006.01)

(52) U.S. Cl.
USPC ........... 701/300; 701/301; 700/255; 700/258; 700/259; 250/341.8

(58) Field of Classification Search
USPC 701/26, 300–301; 250/341.8; 700/258–259, 700/250–251, 245, 255; 318/568.12
See application file for complete search history.

(56) References Cited

U.S. PATENT DOCUMENTS

| | | | |
|---|---|---|---|
| 3,815,132 A * | 6/1974 | Case et al. ...................... 342/65 |
| 4,309,758 A | 1/1982 | Halsall | |
| 5,646,612 A | 7/1997 | Byon | |
| 6,023,064 A * | 2/2000 | Burgin ....................... 250/341.8 |
| 6,799,100 B2 * | 9/2004 | Burns et al. ...................... 701/25 |
| 7,079,943 B2 * | 7/2006 | Flann et al. .................... 701/423 |
| 2002/0143461 A1 * | 10/2002 | Burns et al. .................... 701/117 |

(Continued)

FOREIGN PATENT DOCUMENTS

| | | |
|---|---|---|
| DE | 202007014840 U1 | 4/2008 |
| EP | 0943235 A2 | 2/1999 |

(Continued)

OTHER PUBLICATIONS

Perception and Planning Architecture for Autonomous Ground Vehicles; Touchton, B.; Galluzzo, T.; Kent, D.; Crane, C. Computer; vol. 39 , Issue: 12; Digital Object Identifier: 10.1109/MC.2006.436; Publication Year: 2006 , pp. 40-47.*

(Continued)

*Primary Examiner* — Cuong H Nguyen
(74) *Attorney, Agent, or Firm* — Hoyng Monegier LLP; Coraline J. Haitjema; David P. Owen

(57) ABSTRACT

An apparatus and method for an unmanned vehicle for displacing manure includes navigating an unmanned vehicle, further including detecting an animal, determining whether a current course of the unmanned vehicle will lead to a collision with the animal. If this is the case, the method continues by: determining at least a first priority parameter from a set of priority parameters, wherein the first priority parameter is a standing condition of the detected animal, deciding, on the basis of the set of priority parameters, whether the course of the unmanned vehicle will be adjusted to avoid the animal, wherein the course will be maintained if the set of priority parameters meets a predetermined collision criterion, and the course will be adjusted to avoid the animal if the set of priority parameters does not meet the predetermined collision criterion, wherein the set of priority parameters only meets the collision criterion if at least the standing condition is that the animal is standing.

17 Claims, 3 Drawing Sheets

(56) References Cited

U.S. PATENT DOCUMENTS

| | | |
|---|---|---|
| 2008/0125670 A1 | 5/2008 | Signorini et al. |
| 2008/0162027 A1* | 7/2008 | Murphy et al. ............... 701/117 |
| 2010/0076641 A1* | 3/2010 | Van Den Berg ............... 701/26 |

FOREIGN PATENT DOCUMENTS

| | | |
|---|---|---|
| EP | 1933168 A1 | 6/2008 |
| WO | 9731524 A1 | 9/1997 |
| WO | 00/70938 A1 | 11/2000 |
| WO | 00/70941 A1 | 11/2000 |
| WO | WO00/70935 A1 | 11/2000 |
| WO | WO00/70937 A1 | 11/2000 |
| WO | WO00/70941 A1 | 11/2000 |
| WO | 2004034782 A1 | 4/2004 |
| WO | 2008/118006 A1 | 10/2008 |

OTHER PUBLICATIONS

Design of mapping system for Unmanned Ground Vehicle; Dong-Jin Yoon; Suk-Ho Jang; Jung-Ha Kim; Ubiquitous Robots and Ambient Intelligence (URAI), 2011 8th International Conference on; Digital Object Identifier: 10.1109/URAI.2011.6145976 Publication Year: 2011 , pp. 278-280.*

Obstacle detecting system for unmanned ground vehicle using laser scanner and vision; Hee-Chang Moon; Jae-Hwan Kim; Jung-Ha Kim; Control, Automation and Systems, 2007. ICCAS '07. International Conference on; Digital Object Identifier: 10.1109/ICCAS.2007.4406629; Publication Year: 2007 , pp. 1758-1761.*

Detection of a drivable environment for UGV using multiple laser sensors; Jae-Hwan Kim; Sang-Hoon Lee; Jung-Ha Kim Control, Automation and Systems, 2008. ICCAS 2008. International Conference on; Digital Object Identifier: 10.1109/ICCAS.2008.4694571; Publication Year: 2008 , pp. 590-594.*

Urban driving system for UGV using laser scanner and vision ; Jae-Hwan Kim; Jae-Saek Oh; Jung-Ha Kim ICCAS-SICE, 2009; Publication Year: 2009 , pp. 2421-2424.*

Performance evaluation of UGV obstacle detection with CCD/FLIR stereo vision and LADAR; Matthies, L. et al; Intelligent Control (ISIC), 1998. Held jointly with IEEE International Symposium on Computational Intelligence in Robotics; Digital Object Identifier: 10.1109/ISIC.1998.713790; Publication Year: 1998 , pp. 658-670.*

Autonomous terrain characterisation and modelling for dynamic control of unmanned vehicles; Talukder, A. ; Manduchi, R. ; Castano, R. ; Owens, K. ; Matthies, L. ; Castano, A. ; Hogg, R.; Intelligent Robots and Systems, 2002. IEEE/RSJ Inter. Conf. on; vol. 1; Digital Object Id: 10.1109/IRDS.2002.1041474; Pub. Year: 2002, pp. 708-713, vol. 1.*

T. Grandin, Behavioural Principles of Livestock Handling (With 1999 and 2002 Updates on Vision, Hearing and Handling Methods in Cattle and Pigs), Professional Animal Scientist, Dec. 1989, pp. 1-11 [ published by: American Registry of Professional Animal Scientists].

T. Grandin, Livestock Handling and Transport, 2nd Edition, 2000, CABI Publishing , New York, USA, Chapter 5 (pp. 63-86).

\* cited by examiner

UNMANNED VEHICLE FOR DISPLACING MANURE

This application claims priority from Netherlands application no. 1035980, filed on Sep. 25, 2008, which is hereby incorporated by reference in its entirety.

BACKGROUND OF THE INVENTION

1. Field of the Invention

The invention relates generally to a method of navigating an unmanned vehicle, and more particularly to navigating an unmanned vehicle in a space in which at least one animal is present.

2. Description of the Related Art

International application no. WO 2000/70941 discloses a method of navigating an unmanned vehicle comprising a manure slide, wheels, and a camera. The unmanned vehicle navigates through a stable with cows in a not further described manner with the aid of the camera. It has been found that the known method can lead to unrest in a stable with animals.

BRIEF SUMMARY OF THE INVENTION

The present invention addresses these problems by providing an apparatus and method for navigating an unmanned vehicle in a space in which at least one animal is present, comprising the steps of detecting at least a part of the at least one animal, determining whether a current course of the unmanned vehicle will lead to a collision with the animal, wherein the method, if the current course of the unmanned vehicle will lead to a collision with the detected animal, subsequently comprises the following steps: determining at least a first priority parameter from a set of one or more priority parameters of the detected animal, wherein the first priority parameter is a standing condition of the detected animal, deciding, on the basis of the set of priority parameters of the detected animal, whether the course of the unmanned vehicle will be adjusted to avoid the detected animal, wherein the course of the unmanned vehicle will be maintained if the set of priority parameters meets a predetermined collision criterion, and the course of the unmanned vehicle will be adjusted to avoid the detected animal if the set of priority parameters does not meet the predetermined collision criterion, wherein the set of priority parameters only meets the predetermined collision criterion if at least the standing condition of the detected animal if that the detected animal is standing, and wherein the set of priority parameters does not meet the predetermined collision criterion if the standing condition of the detected animal is that the detected animal is not standing.

Thanks to the inventive method, in specific cases a detected animal is given priority and the unmanned vehicle will deviate. In other cases, determined by the set of priority parameters within which set the animal is at any rate standing, the unmanned vehicle will take priority and not adjust its course to avoid a collision. It is subsequently up to the cow to deviate, or to experience the consequences of a collision. As a result, on the one hand, collisions, which would unnecessarily frighten the animal in question, are prevented, and, on the other hand, the animals are prevented from being able to take over the control of the course of the unmanned vehicle in the stable, or even to use it as their plaything. Incidentally, the method in the situation "no collision predicted" as to the result, i.e. maintaining the course, does not differ from methods in which either an animal is not taken into account at all, or deviation always takes place upon detection of an animal. Since there is no animal, there is no reason to deviate. However, the quintessence of the method according to the invention is to provide the possibility of continuing nevertheless, depending on the set of priority parameters, in the case of a predicted collision. The known methods of deviation will always deviate, whereas the not image-controlled vehicles will never deviate. In particular the adequate deviation of the invention ensures that the vehicle can function efficiently without causing much unrest among the animals.

Although the set of priority parameters can only meet the collision criterion if the standing condition of the detected animal is that the detected animal is standing, when a set of a plurality of priority parameters is used there are combinations of priority parameters, in which, although the detected animal is standing, as a result of one or a plurality of other priority parameters, the set of priority parameters does not meet the collision criterion, so that the unmanned vehicle still deviates. This is defined in more detail in the sub-claims and elucidated in the exemplary embodiments.

In a particular method, the set of priority parameters comprises the relative orientation of the detected animal with respect to the unmanned vehicle, wherein the set of priority parameters only meets the predetermined collision criterion if the standing condition of the detected animal is that the detected animal is standing and the relative orientation of the detected animal is such that the course of the unmanned vehicle is within an observation area of the detected animal, and wherein the set of priority parameters does not meet the predetermined collision criterion if the standing condition of the detected animal is that the detected animal is not standing and/or the relative orientation of the detected animal is such that the course of the unmanned vehicle is outside the observation area of the detected animal. It is thus avoided that the unmanned vehicle collides with an animal which, although it is standing, is not able to see the unmanned vehicle approach.

In one embodiment, the set of priority parameters comprises a position of the animal with respect to the space, wherein the set of priority parameters only meets the predetermined collision criterion if at least the standing condition of the detected animal is that the detected animal is standing and the detected animal is present for less than a predetermined part in a confined area of the space, such as a cubicle, and wherein the set of priority parameters does not meet the predetermined collision criterion if the standing condition of the detected animal is that the detected animal is not standing and/or the detected animal is present for more than the predetermined part in the confined area of the space. It is thus avoided that the unmanned vehicle collides with an animal which, although it is standing, is completely or partially present in for example a cubicle, or in another part of the space where it is unwanted that the animal will be frightened by the unmanned vehicle and/or where the risk is small that the animal will take over the control of the unmanned vehicle.

Incidentally, it is possible to combine the above mentioned two embodiments, so that there is created a set of three priority parameters, wherein the set only meets the collision criterion, and an unmanned vehicle thus does not adjust its course which can lead to a collision, if the animal is standing and the relative orientation of the detected animal is such that the course of the unmanned vehicle is within an observation area of the detected animal and the detected animal is present for less than a predetermined part in a confined area of the space, such as a cubicle. Of course, this set of priority parameters can be extended further with other priority parameters, wherein in each case the whole set of priority parameters should meet the collision criterion in order, according to the inventive method, to make the vehicle not deviate in the case of an approaching collision.

In particular, the predetermined part is a percentage of the detected animal, which percentage is selected from a range of 0-90% and amounts in particular to 75%, 50%, or 25%. It is thus possible to select a suitable percentage at which the animal is not hit by the unmanned vehicle if it is present for at least this part in the confined area, depending on the configuration of the space, on the confined area of the space, and on the reactions of the animals in practice.

The inventive also relates to a method of navigating an unmanned vehicle in a space in which at least one animal is present, which method comprises the following steps: detecting at least a part of the at least one animal, determining whether a current course of the unmanned vehicle will lead to a collision with the detected part of the animal. The method subsequently comprises—if the current course of the unmanned vehicle will lead to a collision with the detected part of the animal—the following steps: determining a priority parameter of the detected animal, deciding, on the basis of the priority parameter of the detected animal, whether the course of the unmanned vehicle will be adjusted to avoid the animal, wherein the course of the unmanned vehicle will be maintained if the priority parameter meets a predetermined collision criterion.

In one embodiment, the priority parameter meets the predetermined collision criterion if the detected animal is standing on at least part of its legs, preferably on all its legs. An animal which is standing can easily deviate, while an animal which is completely lying has first to get up. This is relatively stressful, so that in this case the animal is given priority. An animal which is standing on part of its legs is probably just going to get up or to lie down and is therefore able to deviate, if desired. In a variant, such an animal is also given priority, so that the priority parameter only meets the collision criterion if the animal is standing on all its legs.

In another embodiment, the priority parameter meets the predetermined collision criterion if the detected animal has such an orientation with respect to the unmanned vehicle that the course of the unmanned vehicle is within an observation area of the detected animal. As a result, the animal will be given priority if it is not able to see the unmanned vehicle approach. If the animal is indeed able to see it approach, the animal will have to deviate itself to avoid a collision.

In a further embodiment, the priority parameter only meets the predetermined collision criterion if the detected animal is standing on at least part of its legs, preferably on all its legs, and if the detected animal has such an orientation with respect to the unmanned vehicle that the course of the unmanned vehicle is within the observation area of the detected animal. As a result, the animal only needs to get out of the way of the unmanned vehicle if it is standing on its legs and is able to see the vehicle approach. In other cases, the unmanned vehicle will give way to the animal and consequently deviate.

In particular, the observation area comprises at least the area in front of the forelegs of the detected animal. This is a conservative confinement of the observation area, which in practice can easily be determined by a computer which is linked to detection mechanism of the unmanned vehicle. More in particular, the observation area further comprises an area next to the detected animal, which area is confined by a virtual line which extends obliquely rearwards from the head of the detected animal. The extent to which the virtual line extends rearwardly is determined by the position of the eyes in the head of the animal in question.

In one embodiment, the method comprises, prior to the step of deciding on the basis of the priority parameter, a step of determining a position of the detected part of the animal with respect to the space. The course of the unmanned vehicle is adjusted to avoid an animal if the detected animal is present for more than half, preferably substantially completely, in a confined area of the space, such as a cubicle, whereafter the method restarts with the step of detecting at least a part of the at least one animal. Thanks to this measure it is prevented that an animal which is present in a confined area of the space will be forced to leave same. It is thus also prevented that an animal whose hind legs are for example outside a cubicle will be stimulated to enter the cubicle completely and possibly will subsequently relieve itself in the cubicle.

The invention further relates to software for performing for navigating an unmanned vehicle in a space in which at least one animal is present, the method comprising detecting at least a part of the at least one animal, and determining whether a current course of the unmanned vehicle will lead to a collision with the animal, wherein the method, if the current course of the unmanned vehicle will lead to a collision with the detected animal, subsequently comprises the following steps: determining at least a first priority parameter from a set of one or more priority parameters of the detected animal, wherein the first priority parameter is a standing condition of the detected animal, deciding, on the basis of the set of priority parameters of the detected animal, whether the course of the unmanned vehicle will be adjusted to avoid the detected animal, wherein the course of the unmanned vehicle will be maintained if the set of priority parameters meets a predetermined collision criterion, and the course of the unmanned vehicle will be adjusted to avoid the detected animal if the set of priority parameters does not meet the predetermined collision criterion, wherein the set of priority parameters only meets the predetermined collision criterion if at least the standing condition of the detected animal if that the detected animal is standing, and wherein the set of priority parameters does not meet the predetermined collision criterion if the standing condition of the detected animal is that the detected animal is not standing.

The unmanned vehicle, according to various aspects of the present invention, includes in a space in which at least one animal is present, comprising a frame, with mounted thereon a propulsion mechanism and a navigation mechanism, wherein the vehicle further comprises a sensor for forming an image of an observation area, wherein the sensor comprises a sensor image processor that is operatively connected to the navigation mechanism, and wherein at least one of the sensor image processor and the navigation mechanism is configured to detect at least a part of the at least one animal, and determine whether a current course of the unmanned vehicle will lead to a collision with the animal, wherein the at least one of sensor image processor and navigation mechanism, if the current course of the unmanned vehicle will lead to a collision with the detected animal, subsequently: determine at least a first priority parameter from a set of one or more priority parameters of the detected animal, wherein the first priority parameter is a standing condition of the detected animal, decide, on the basis of the set of priority parameters of the detected animal, whether the course of the unmanned vehicle will be adjusted to avoid the detected animal, wherein the course of the unmanned vehicle will be maintained if the set of priority parameters meets a predetermined collision criterion, and the course of the unmanned vehicle will be adjusted to avoid the detected animal if the set of priority parameters does not meet the predetermined collision criterion, wherein the set of priority parameters only meets the predetermined collision criterion if at least the standing condition of the detected animal if that the detected animal is standing, and wherein the set of priority parameters does not meet the predetermined collision criterion if the standing condition of the detected animal is that the detected animal is not standing.

The vehicle comprises a frame, preferably with material remover mounted thereon, in particular manure remover, propulsion mechanism and navigation mechanism connected to the propulsion mechanism and comprising a sensor for forming an image of an observation area. On the basis of the image of this sensor the environment is analysed and the course is determined.

The sensor is in particular a 3D sensor. In various embodiments, the sensor comprises a time-of-flight sensor, comprising a light source which is configured for transmitting one or more light pulses, and a matrix of light sensitive sensors, wherein the time-of-flight sensor is configured to determine the time elapsed between transmission of the light pulse and recording of reflected radiation in the light sensitive sensors. On the basis thereof, and at a known light velocity, it is possible to determine the distance from the sensor to objects in the environment.

In embodiments, the (3D) sensor comprises a source of radiation for emitting modulated electromagnetic radiation, in particular light, a receiver device for receiving electromagnetic radiation reflected by an object in the observation area, an optical device for imaging the reflected electromagnetic radiation on the receiver device, and sensor image processor, wherein the receiver device comprises a matrix with a plurality of rows and a plurality of columns of receivers, and wherein the sensor image processor is configured to determine for each of the receivers a phase difference between the emitted and the reflected electromagnetic radiation in order to calculate a distance from the receiver to the object. More precisely, the sensor image processor calculates in this case the distance from the receiver to the part of the observation area imaged on that receiver. For the sake of convenience, the latter distance will be denoted hereinafter by distance from the receiver to an object in that observation area. That object then relates advantageously to material to be removed, such as manure, straw, rests of feed, etc.

By using such a matrix of receivers and by determining for these receivers a distance, like in this case by means of phase shifting of the emitted light, it is possible to obtain per observation a complete spatial image. This spatial image is in fact composed in one go, instead of by scanning All this will be explained hereinafter in further detail. Incidentally, it is explicitly pointed out here that for the method and the system according to the invention a time-of-flight sensor will provide comparable advantages, but the description is limited below to the second mentioned 3D sensor variant, without limiting the scope of protection thereto.

In one embodiment, the sensor image processor is configured to form a three-dimensional image of the observation area, in particular of an object therein. In principle, the series of measured distances will suffice, but it may be advantageous to produce also a three-dimensional image, for example for visual control. In this case, the image formed is transferred to a display screen or the like. In this case, the distance may, for example, be displayed by false colors, or the image may be rotated, etc.

It should be noted here that the optical device, i.e. the lens or lenses, is an optical system which casts an image of the observation area on the receivers, and which determines from what direction measurement takes place. There may be selected a wide or narrow angle of view of the observation area. Advantageously, the optical device comprises an adjustable optical device by means of which the angle of view can be selected, such as a zoom optical device.

It should be noted here that the sensor is also suitable as an "ordinary" camera, i.e. a 2D camera which is capable of recording grey tone values. In this case, the emitted and reflected radiation is not recorded as a matrix of depth or distance data, but as an image of the observation area. On the basis of this image, and in particular grey tone values, additional information can be obtained. On the basis of the detected image and the momentary course it is also possible to determine whether there is a chance of collision with a cow or the like.

In particular, the sensor image processor and/or the navigation mechanism is configured to recognize an object in a thus produced grey tone values image. An example here is the recognition of manure on sawdust or the like. Manure will in general have a low reflection capacity (be dark), while sawdust is usually light colored. All this may depend on the radiation applied by the sensor.

The sensor image processor and/or the navigation mechanism is configured to adjust, if an obstacle is detected, the position and/or the speed of the vehicle. For example, if an animal, a child or other moving object is recognized, the speed will be reduced, if desired to zero, according to the inventive method. In the case of unknown obstacles, a warning signal can be supplied, if desired.

In particular, the sensor image processor is configured to determine repeatedly an image of the observation area, in particular of an object therein. Although, in principle, it is sufficient to determine only once a three-dimensional or not three-dimensional image, to perform the further control on the basis thereof, it is advantageous to perform this determination a plurality of times (successively). It is thus possible to take into account changing circumstances, and in particular movements of an animal or the like which is present.

Below, a sensor of the vehicle according to the invention will briefly be set out in further detail. The source of radiation emits electromagnetic radiation. Preferably, light is used for this purpose, more preferably infrared radiation, more preferably near-infrared (NIR) radiation. The fact is that, for this purpose, suitable LEDs can be used which are very easy to control by means of an electrically controllable supply current, and which are, in addition, very compact and efficient and have a long service life. Nevertheless, other sources of radiation could be used as well. The advantage of (near-) infrared radiation is that the radiation does not irritate animals which may be present.

The radiation is modulated according to a modulation frequency which is, of course, different from and much lower than the frequency of the electromagnetic radiation itself. The, for example, infrared light is in this case a carrier for the modulation signal. The modulation helps to determine the phase difference of emitted and reflected radiation. Preferably, the modulation is amplitude modulation.

By means of the emitted radiation, the distance is determined by measuring a phase shift of the modulation signal, by comparing the phase of reflected radiation with the phase of reference radiation. For the latter, the emitted radiation is usually (almost) directly passed on to the receiver, at any rate with a known distance between the source and the receiver, so that the actual distance can easily be determined from the measured phase difference by applying $$\text{Distance} = \frac{1}{2} \times \text{wavelength} \times (\text{phase difference}/2\pi),$$

wherein the wavelength is that of the modulation signal. It should be noted that the above relation does not make allowance for unique determination of the distance which results from the fact that a phase difference, due to the periodicity, may be associated with a distance A, but also with A+n×(wavelength/2). For this reason, it may be sensible to select the wavelength of the amplitude modulation in such a manner that the distances which occur in practice are indeed uniquely determined.

Preferably, a wavelength of the amplitude modulation of the emitted light is between 1 mm and 20 m. Hereby distances may be uniquely determined up to a maximum distance of 0.5 mm to 10 m. In practice, often a sub-range of that distance is adhered to, for example between 0.5 mm and 5 m, due to loss of light and, partially as a result thereof, noisy and possibly inaccurate measurements. A modulation frequency of 300 MHz to 15 kHz is associated therewith, which modulation frequency can easily be realized in electric circuits for controlling LEDs. It should be noted that, if desired, it is also possible to select even smaller or larger wavelengths. It is advantageous, for example, to select the wavelength in dependence on the expected to be determined distance. For example, when looking for material to be removed, that distance will often be between 10 cm and 100 cm, so that a preferred wavelength range will be between 20 cm and 200 cm, and consequently a preferred frequency range will be between 1.5 MHz and 150 kHz.

In a preferred embodiment, a wavelength is adjustable, in particular switchable, between at least two values. This provides the possibility of performing, for example, first a rough measurement of the distance and/or the size, by means of the large modulation wavelength. For, this wavelength provides a reliable measurement over great distances, albeit with an inherent lower resolution. Here, it is assumed for the sake of simplicity that the resolution is determined by the accuracy of measuring the phase, which can be measured, for example, with an accuracy of y %. By first measuring at the large wavelength it is possible to measure the rough distance. Subsequently, it is possible to perform, at a smaller wavelength, a more precise measurement, wherein the unique determination is provided by the rough measurement.

By way of example, first a measurement is performed at a wavelength of 2 m. The accuracy of the phase determination is 5%. The measured phase difference amounts to (0.8×2pi) ±5%. The measured distance then amounts to 0.80±0.04 m. The next possibility would be 1.80±0.04 m, which, however, can be excluded on the basis of the expected distance. Subsequently, measurement is performed at a wavelength of 0.5 m. The measured phase difference amounts to 0.12×2pi modulo 2pi, and again with ±5%. This means that the distance amounts to 0.12×0.25 modulo 0.25, so 0.03 modulo 0.25 m. As the distance should moreover amount to 0.80±0.04, the distance should be equal to 0.78 m, but now with an accuracy of 0.01 m. In this manner the accuracy can be increased step by step, and the different modulation wavelengths can be selected on the basis of the accuracy of the previous step.

Advantageously, the sensor, at least a provided sensor control, is configured to automatically adjust the wavelength or, of course, the frequency, to the determined distance. This makes it possible to determine the distance and/or the size more accurately in a next step.

It is also advantageous, for example, first to determine roughly the position/distance/size at a large wavelength, and subsequently to determine the speed from the change of position, which can indeed be uniquely determined from the change of the phase difference, and then preferably measured at a smaller wavelength.

In a preferred embodiment, the source of radiation emits radiation in a pulsed manner, preferably at a pulse frequency of between 1 Hz and 100 Hz. Here, the pulse length is preferably not more than ½ part, more preferably 1/n part of a pulse period. This provides radiationless pauses between the pulses, which may be used for other purposes, such as data transmission. For this purpose, the same source of radiation could then be used for example, but now with a different transmitter protocol; however, no measurement nevertheless being suggested or disturbed by the sensor. Additionally, it is possible to operate a different source of radiation and/or sensor in the pauses, in which case mutual interference neither takes place.

Preferably, the source of radiation has an adjustable light intensity and/or an adjustable angle of radiation. This provides the possibility of adjusting the emitted radiation intensity or the emitted amount of radiation energy to the light conditions, which may result in energy saving. In the case of a short distance and a strong reflecting capacity, for example, less radiation is required than in the case of a great distance and a relatively strong absorbing capacity, of, for example, an amount of manure or the like. It is also possible to adjust the angle of radiation to the angle of view of the sensor, because the radiation angle of view need not be greater than that angle of view. It may be advantageous, for example, when navigating through a space, to select a great angle of radiation, such as for example between 80° and 180°, because the angle of view used in that case will often be great as well. On the other hand, when 'navigating' on a heap of material to be removed or the like, the angle of radiation may also be selected smaller, such as for example between 30° and 60°. Of course, other angles of radiation are possible as well.

Alternatively or additionally, a sampling time of the sensor may be adjustable. For example, there is provided a mode in which a sampling time has been prolonged, for example has been doubled. Also in this manner it is possible to adjust the implement to more unfavorable conditions, because the total received amount of light increases. This may be advantageous, for example, at low reflection of the objects and the environment, or if there is, on the contrary, much scattered light. By way of example, a standard sampling time is 8 ms, whereas for difficult conditions the sampling time may be prolonged, to for example 16 ms.

In a particular embodiment, the receiver device, and advantageously also the source of radiation, is disposed rotatably and/or telescopically. This provides the advantage that for efficient navigation not the entire vehicle, but only the receiver device and, possibly, also the source of radiation, has to be rotated. The vehicle then 'looks about' as it were. This is in particular advantageous if the angle of view, and possibly also the angle of radiation, is relatively small, in order to ensure in this manner a relatively high resolution. However, it is also possible, of course, to dispose the receiver device and the source of radiation rigidly, for the purpose of a greatest possible constructional simplicity. Additionally or alternatively, the receiver device, and advantageously also the source of radiation, may be telescopic. As a result thereof, the sensor may, if not required, e.g. be protected from influences from outside, while it may assume a favourable detection position, if this is desired.

In another embodiment, the sensor comprises receivers which are positioned in such a manner that the sensor has an observation area with an angle of view of at least 180°, preferably of substantially 360°. In this case, it is possible to use either a single ultra wide-angle lens ('fisheye') to cast the image on the sensor, but it is also possible to use a sensor with a plurality of (image) surfaces, and associated lenses, or in other words a sensor with a plurality of sub-sensors, which comprise each a plurality of rows and columns of receivers. The advantage of this embodiment is that it is capable of overlooking in one go the complete field of view to move in one direction, and even of detecting a complete around-image. This is particularly favorable for navigating and guiding.

In a particular embodiment, an angle of view of the observation area of the sensor is adjustable. The angle of view may then be selected, for example, in accordance with the observation object or area. It is advantageous, for example, when guiding to a heap of material to be removed, to select the angle of view as a small one, with a corresponding higher resolution. It may also be advantageous to keep disturbing radiating objects, i.e. hot objects, such as incandescent lamps, away from the observation area by advantageously selecting the angle of view. For this purpose, it is possible, for example, to dispose an objective (lens) with variable focal distance ('zoom lens') in front of the sensor. It is also possible to select only a limited area of the receivers of the sensor. This is comparable with a digital zoom function.

Advantageously, at least a part of the sensor, in particular a source of radiation and/or the receiver device, is resiliently suspended from the frame. An advantage thereof is that, for example, an animal such as a cow will less soon get injured by the sensor which, of course, often projects to some extent, and thus forms a risk for legs and the like. On the other hand, the source of radiation and/or the receiver device are/is thus better protected from jolts caused by, for example, the same legs.

In a further embodiment, the navigation mechanism is operatively connected to the sensor, in particular to the sensor image processor, and more in particular the navigation mechanism comprises the sensor. As already pointed out now and then in the foregoing, the present invention may not only be applied for, for example, detection of and guiding to material to be removed, but also, for example, for guiding the vehicle as a whole to, for example, a recharging point, etc. It is then possible for the navigation mechanism to receive information via the sensor, in order thus to be able to map out a route.

In particular, the sensor image processor is configured to recognize at least one of a heap of material to be removed such as manure, an animal or a part thereof such as a leg of the animal. If such recognition mechanism is incorporated in the sensor image processor, or, of course, in a control device which is operatively connected thereto, the vehicle is very well capable of finding in an efficient manner its way to material to be removed such as manure, or around an animal. In particular, this may be of importance for safety. For example, if the implement is configured to recognize a calf, or other young animal, it is possible to prevent that a calf born from a cow which has calved prematurely is recognized as material to be removed, which is, of course, dangerous and very undesirable. The vehicle is also capable of recognizing whether a box or other object to be cleaned is free from animals. Needless to say that such a vehicle is capable of saving a lot of labour. Such image recognition mechanism is, incidentally, known per se in the state of the art, and will not be explained here in further detail.

In particular, the image recognition mechanism comprises previously stored information regarding position and/or orientation of one or more reference objects. Advantageously, the sensor image processor is moreover configured for orientation in the observation area on the basis of comparing the observed image with the stored information. Very efficient navigation is thus possible. Examples of reference objects are a door, a box, a beacon or the like. Advantageously the reference object comprises a marking, in particular a line or pattern on a floor of, for example, a stable, in which case the reference object has a high reflection coefficient for the emitted radiation. The line or the pattern may be used as an easily to be recognized orientation mechanism, while the high reflection ensures a reliable signal. Such a reference object is advantageous if the vehicle often follows the same route, for example from a box to an unloading place for the material removed.

In a particular embodiment, the sensor is configured to distinguish the plurality of sub-objects, i.e. to recognize and process a plurality of objects in one image, if the object in the observation area comprises a plurality of sub-objects. This may be distinguished, for example, because in the group of points from which radiation is reflected there is a discontinuously changing distance between at least a first group of points and a second group of points. It is thus possible to distinguish between a plurality of separate amounts of material to be removed, or between material to be removed and a part of an animal which, of course, can move. However, these techniques are known per se in the state of the art, so that this will not be set out here in further detail.

In another embodiment, the sensor image processor is configured to determine a mutual distance between two of the plurality of sub-objects. This is, for example, advantageous when navigating, because the sensor or the navigation mechanism is then able to determine whether the vehicle can pass through between the two sub-objects.

In a further embodiment, the sensor image processor is configured to determine repeatedly, from an image of the observation area, a position and/or a mutual distance to the distinguished subject, especially the material to be removed. It is sufficient per se to determine only once the relevant position and/or the mutual distance to that material. However, it is advantageous to do this repeatedly, because the vehicle is thus able to anticipate, for example, unforeseen changes, such as an animal which comes into the path of the vehicle. Therefore, the vehicle according to this embodiment is capable of following an animal which may be present in a very efficient manner in the case of such movements.

In another embodiment, the sensor image processor is configured to calculate the speed of the vehicle relative to the material to be removed from a change of the position and/or the mutual distance, and in particular to minimize, advantageously on the basis of the calculated speed, the mutual distance between the vehicle and the material to be removed, which will effect an even more efficient navigation. Alternatively, the speed and/or the position can also be adjusted, for another purpose, such as avoiding.

The material displacing mechanism advantageously comprises a material slide, so that the material can be slid from the floor. This is a very simple embodiment for removing material, wherein it is possible to slide that material, for example, to a central collecting place.

The material slide is preferably made of flexible material, the flexibility being chosen in such a manner that, when displacing material, the material slide will at least substantially keep its shape, whereas, when colliding with a not recognized small obstacle which is rigidly fitted in or on the floor, the material slide will deform in such a manner that it is capable of passing along the obstacle.

More advantageously, the material displacing mechanism comprise the material take-up mechanism with a material storage, in particular material pick-up mechanism and/or material sucking mechanism. With the aid of such mechanisms of displacement of unwanted material, by smearing and the like, is avoided in an efficient manner.

Such material pick-up mechanism may comprise, for example, a gripper with a jaw portion, and advantageously with at least two jaw portions, as well as a storage container. In a similar manner, the material sucking mechanism may comprise a suction pump, whether or not supported by, for example, rotating brushes or the like.

In various embodiments, the vehicle further comprises a cleaning device for cleaning an environment, in particular a floor cleaning device for cleaning a stable floor. In addition to the removal of material, this enhances the hygiene of the environment. The cleaning device comprises, for example, at least one rotating or reciprocatingly movable brush and/or a cleaning liquid applying device, if desired complemented by a sucking device for sucking material loosened by brushing and/or cleaning liquid. In one embodiment, the material sucking mechanism and the sucking device are preferably combined.

A further advantage of the vehicle according to the invention is that it is capable of judging very well whether the material to be removed has actually been removed substantially completely. For this purpose the vehicle, at least the control device, is preferably configured to form again an image of the observation area, after a material removing action, and to judge whether the material to be removed has disappeared from that image. For example, the control device is configured to judge the image of the observation area as cleaned if in the depth image of that observation area no deviating height differences are recognized, or if the reflection capacity of the floor in the observation area does not deviate significantly from a predetermined average value.

In another embodiment, the vehicle further comprises at least one of a connection for electric power supply, a connection for material supply, in particular manure, used washing and/or disinfecting liquid, and a connection for a liquid, in particular a washing or disinfecting liquid, wherein the sensor image processing mechanism is configured to couple the connection to a counter-connection for that connection, by recognizing the connection and the counter-connection and minimizing the mutual distance between the connection and the counter-connection. It is thus possible for such a vehicle to perform even more functions without the intervention of an operator. In this case, the coupling of the connection to the counter-connection may comprise steps which are comparable with the steps for locating and removing the material to be removed. This means: the vehicle comprises controller, connected to the sensor image processor, which minimize, on the basis of the image of the connection and the counter-connection, the distance there between, in order thus to realize the coupling. In this case, the connection and/or the counter-connection are preferably self-searching.

BRIEF DESCRIPTION OF THE DRAWINGS

The features and advantages of the invention will be appreciated upon reference to the following drawings, in which.

DESCRIPTION OF ILLUSTRATIVE EMBODIMENTS

Figure 1:
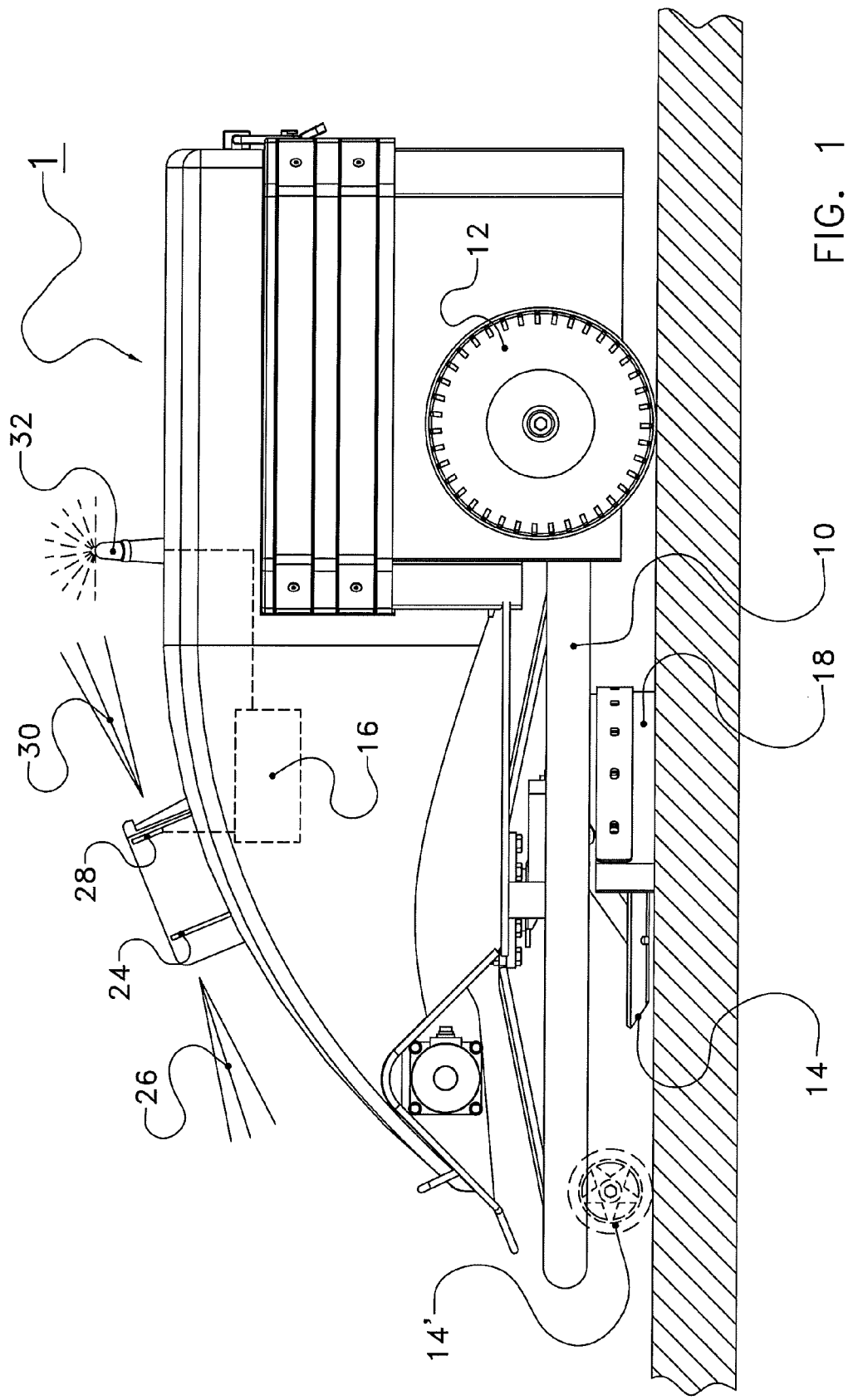
FIG. 1 is a diagrammatic side view of an unmanned vehicle according to the invention.

The following is a description of certain embodiments of the invention, given by way of example only and with reference to the drawings. Referring to FIG. 1, a unmanned vehicle shown in a diagrammatic side view is generally denoted by the reference number 1. It comprises a frame 10 with rear wheels 12 and a sliding shoe 14 and/or optionally front wheels 14' which are indicated here by a dashed line, and with a control device 16. A manure slide 18 is disposed on the frame 10. There are further provided a first sensor 24 which emits a first light beam 26, as well as a second sensor which emits a second light beam 30, as well as a communication device 32.

The vehicle 1 is self-propelled, i.e. autonomously displaceable, by means of wheels 12 and/or 14' driven by a not shown drive. The control of the drive is preferably connected to the sensor image processor and/or navigation mechanism, which are not separately depicted here. In fact, it is advantageous, for reasons of compactness, to combine both the sensor image processor, the navigation mechanism, robot control mechanism (neither shown) and other control mechanism, if any, in the control device 16 which comprises, for example, a CPU or comparable device.

In one embodiment shown here, the manure slide 18 is made of flexible material. In this case, the flexibility is chosen in such a manner that, when displacing manure, the manure slide will at least substantially keep its shape, whereas, when colliding with a not recognized small obstacle which is rigidly fitted in or on the floor, the manure slide will deform so as to be capable of passing along the obstacle.

A light source in the first sensor 24, or separate light source, emits a first light beam 26. The first observation area of the first sensor 24 substantially corresponds to the solid angle in which the first radiation beam 26 is emitted, but may also be smaller. Likewise, the second sensor 28, or separate light source, emits a second light beam 30, and the second observation area will roughly correspond to the solid angle in which the second light beam is emitted.

The first observation area, which is, incidentally, shown very diagrammatically in FIG. 1, will be used in practice to navigate the vehicle 1. It will be possible to use the second observation area to be able to navigate in an area behind the vehicle 1.

The communication device 32 may be used for communication with an external PC, data storage, etc. For this purpose, there may be used radio signals, optical signals, and the like. For example, the image which is produced by means of the first and/or the second sensor may be sent to a control panel. The communication device may also serve to emit a warning signal, for example in the case of an operational failure. The signal may, for example, be visible and/or audible.

Figure 2:
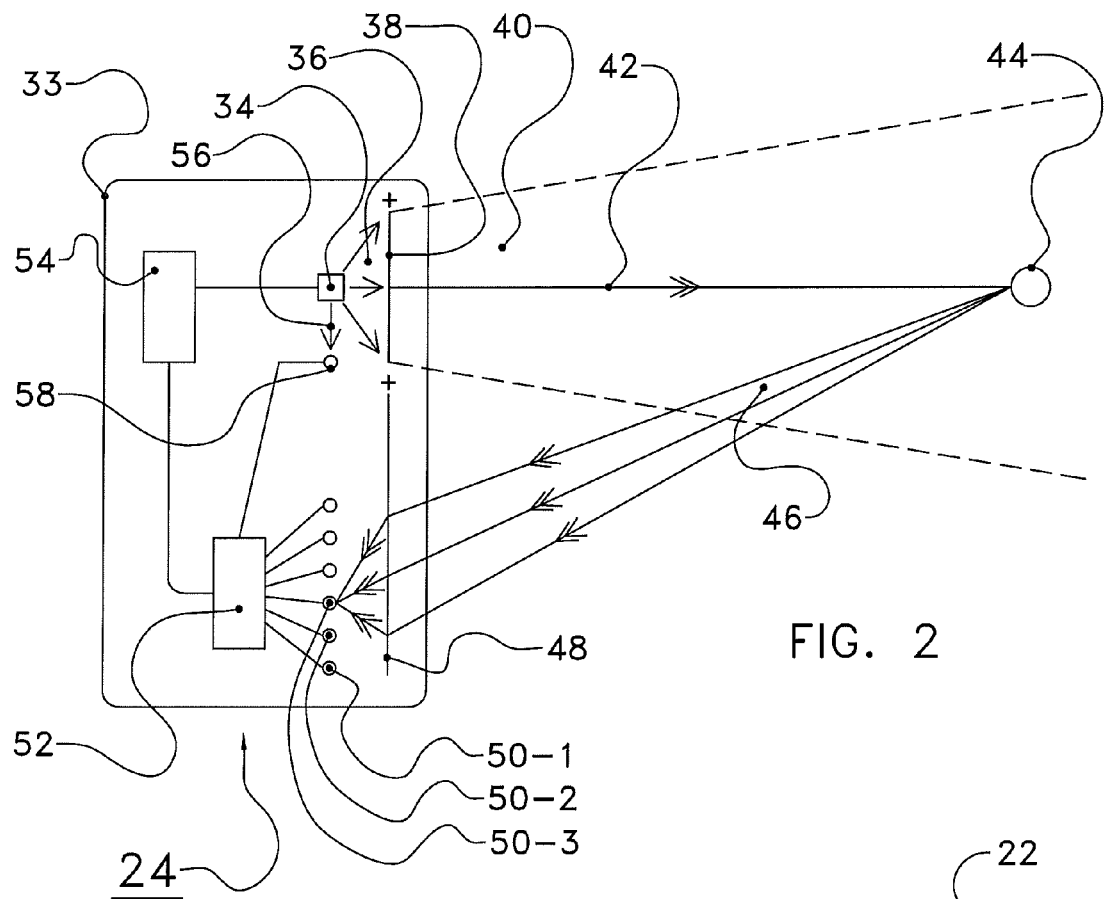
FIG. 2 is a diagrammatic view of a detail of a sensor of the unmanned vehicle according to the invention.

FIG. 2 is a diagrammatic view of a sensor in operation. The sensor 24 comprises a housing 33 with a light source 34 which emits light 36 which is formed by the exit optical device 38 into an outgoing beam 40. A first ray 42 thereof hits an object 44, such as a heap of manure, and is reflected as a reflected beam 46 which is displayed, via the entrance optical device 48, on a number of receivers 50-1, 50-2, 50-3, . . . . The signals from those receivers are processed by the sensor image processing device 52 which is connected to the sensor control 54. The sensor control 54 is also connected to the light source 34 which also emits a reference ray 56 to the reference receiver 58.

The housing 33 is, for example, a moisture-proof and dust-proof housing of shock-proof synthetic material or metal, which may be attached on the milking implement in a resilient or otherwise shock-absorbing manner. The housing 33 comprises a front side. At the front side there is included an exit optical device 38 which forms light 36 from one or a plurality of light sources 34 into a desired outgoing beam 40. The outgoing beam need not be wider than the desired observation area, and preferably corresponds thereto. For this purpose, the exit optical device 38 may advantageously be an adjustable or even a zoom lens.

In this embodiment, the light source 34 comprises infrared light emitting diodes (IR-LEDs), but may also comprise other colours of LEDs, or a laser diode, etc. It should be noted that everywhere in this document the term 'light' is used, but that this may generally be read as 'electromagnetic radiation'. The light source 34 is connected to the sensor control 54 which, for example, applies an amplitude modulation signal over the control current of the IR-LEDs of light source 34, or otherwise effects a modulation of the light 36. An exemplary modulation frequency is, for example, 100 kHz, but this may be selected within very wide margins, and even be adjustable. Incidentally, there may also be provided a separate light source control, which may be connected itself to the sensor control 54, or a general control device 16. The light intensity of the light source 34 may be adjusted within associated limits, for example, by increasing the supplied power.

There may be provided a not shown power supply for the light source 34, for the sensor 24, and even for the vehicle 1 as a whole. It should be noted that neither the power supply, nor any of the sensor control 54, the sensor image processing 52 to be described hereinafter, nor even the light source 34, need be provided in the sensor 24, but may, for example, also be provided elsewhere on the vehicle. The connections may be wired or wireless connections.

In a variant, the exit optical device 38 is provided at the inner side of the front side, the front side being made from a material which is transmissible for the emitted light. In this manner the exit optical device 38, and in general the interior of the sensor 24, is protected from external influences, while a flat front side of synthetic material can easily be cleaned.

In the outgoing beam 40, or in many cases in the observation area, there is an object 44, such as a heap of manure, a cow's leg or the like, which is irradiated by a first ray 42. The object 44 will partially reflect that first ray 42 in a reflected beam 46. Only a small part thereof is depicted, which part is formed into an image by the entrance optical device 48. The entrance optical device 48 may also effect an adjustment of the image to the desired observation area or vice versa, and may, for example, be designed for this purpose as an adjustable lens or even as a zoom lens.

In the housing 33 there is further included a place-sensitive receiver device, such as a CMOS or a CCD or the like. The receiver device comprises a matrix with a plurality of rows and columns of receivers 50-1, 50-2, 50-3, . . . , in the form of photodiodes or other light-sensitive elements. In an exemplary embodiment, this is a matrix of 64×64 photodiodes, but resolutions of 176×144, 640×480, and other, smaller or larger, matrices are likewise possible. For the sake of clarity, only a very small number of receivers, and only in one single row, are depicted in FIG. 2. Here, the reflected beam 46 is found to be displayed on the receiver 50-3, which will supply a signal. If, for example, the object 44 is larger, or the resolution of the sensor 24 is greater, there will be per object 44 a plurality of receivers 50-1, . . . , which will supply a signal. This is also the case if a plurality of objects 44 are present in the observation area.

Consequently, in the depicted case, (only) the receiver 50-3 supplies a signal, from which a phase can be determined by means of known techniques, such as sampling at four points, at a known frequency. For this purpose, the sensor image processing device 52 may, for example, be equipped with suitable circuits. The sensor control 54 may also be equipped for this purpose.

This phase is compared with the phase of a reference ray 56 which is transmitted to and received by a reference receiver 58. It is not relevant whether the latter is located immediately next to the light source 34, as long as the optical path length, and consequently the acquired phase difference of the reference ray 56, between the light source 34 and the reference receiver 58, is known.

For each receiver 50-1, . . . , there is determined, from the phase difference between the reference ray 56 and the beam reflected on the receiver, a distance with the known relation between wavelength and phase difference. This takes place in principle substantially parallel and simultaneously for each of the receivers 50-1, . . . . There is thus created a 2D collection of distances, from which a spatial image of the observed object 44 can be formed.

If necessary, the measurement is also performed at one or more other modulation wavelengths, in order to achieve a unique determination in distance, or an increased accuracy. If desired, it is also possible to repeat the measurement at one and the same modulation wavelength, for example to increase the reliability, to take changes in the observation area into account, such as movement, or even to determine a speed of an object 44 in that observation area, by measuring the change of a distance. For this purpose, the sensor control 54 can be configured in a simple manner. A favourable repeat speed is, for example, at least 16 Hz, because it is thus possible to display movements sufficiently flowing, at least for human beings. For higher accuracy of control, a higher repeat speed, such as 50 Hz or 100 Hz is even better. Other repeat speeds are possible as well, such as, for example, 1 Hz to 2 Hz, such as for unanimated objects, such as a heap of manure.

In one embodiment, short light pulses may be emitted by the light source 34, provided that each light pulse comprises at least one whole wave, preferably two or more waves, of the modulated signal. At the modulation frequencies occurring in practice, this can easily be realized.

In another embodiment, the sensor comprises a Photonox Mixer Device (PMD), which incorporates in a suitable manner a matrix of light-sensitive and distance-sensitive sensors.

In practice, the vehicle with the sensor according to the invention will be able to recognize material to be removed, for example because the observed image contains depth information which should not be present therein. For, the floor is assumed to be flat, or to extend at least in a known manner. If another depth is found in the image, i.e. another distance than an anticipated distance, this is an indication of the presence of often unwanted material. If desired, it is possible to make an additional judgement about this by means of additional image recognition techniques, for example by means of a spectral (colour) analysis which indicates whether the subject comprises manure, feed or the like. After positive recognition made in this manner it is possible for the vehicle 1 to displace the material 44 by means of the manure slide 18, for example to a collecting point.

Figure 3:
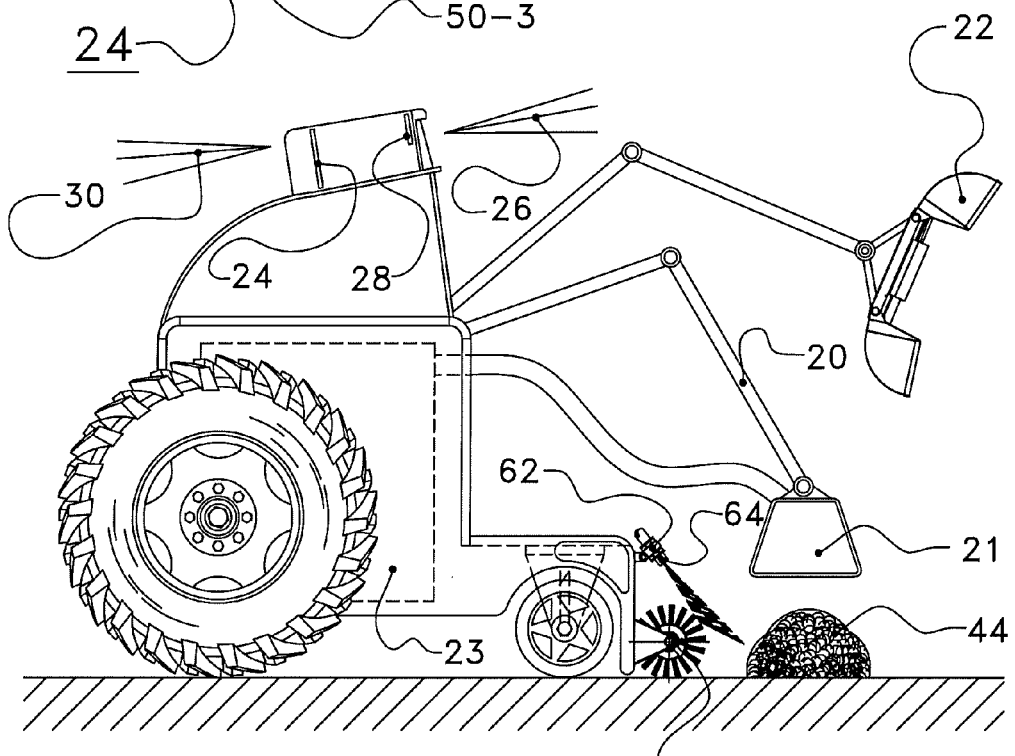
FIG. 3 is a diagrammatic side view of another unmanned vehicle according to the invention.

FIG. 3 is a diagrammatic side view of another unmanned vehicle according to the invention. Similar components will not be separately indicated again.

Here, the vehicle comprises material pick-up mechanism and material sucking mechanism provided with a storage and with a cleaning device. The material pick-up mechanism comprise a gripper 22. The material sucking mechanism comprise a suction nozzle 21 with a guide mechanism 20. The storage is denoted by 23. The cleaning device comprises a rotatable brush 60 and a spray nozzle 62 which is capable of ejecting a jet of liquid 64.

Under the control of the sensor of the vehicle, the gripper is capable of picking up the heap 44 and depositing the latter, if desired, in the storage 23. Alternatively or additionally, under the guidance of the guide mechanism 20 which itself is under the control of the sensor, the suction nozzle 21 is capable of sucking the heap 44.

Additionally, the cleaning device is capable of cleaning the floor, for example by brushing by means of the brush 60 and/or providing a jet of cleaning and/or disinfecting liquid 64. This liquid may be sucked, together with loosened material, by means of, for example, the suction nozzle 21. If desired, brushing may subsequently take place by means of the brush 60, and, if desired, sucking may take place again. Additionally, both during and after the cleaning process, the sensor may take an image of the area to be cleaned, in order to verify whether cleaning has been carried out properly.

Figure 4:
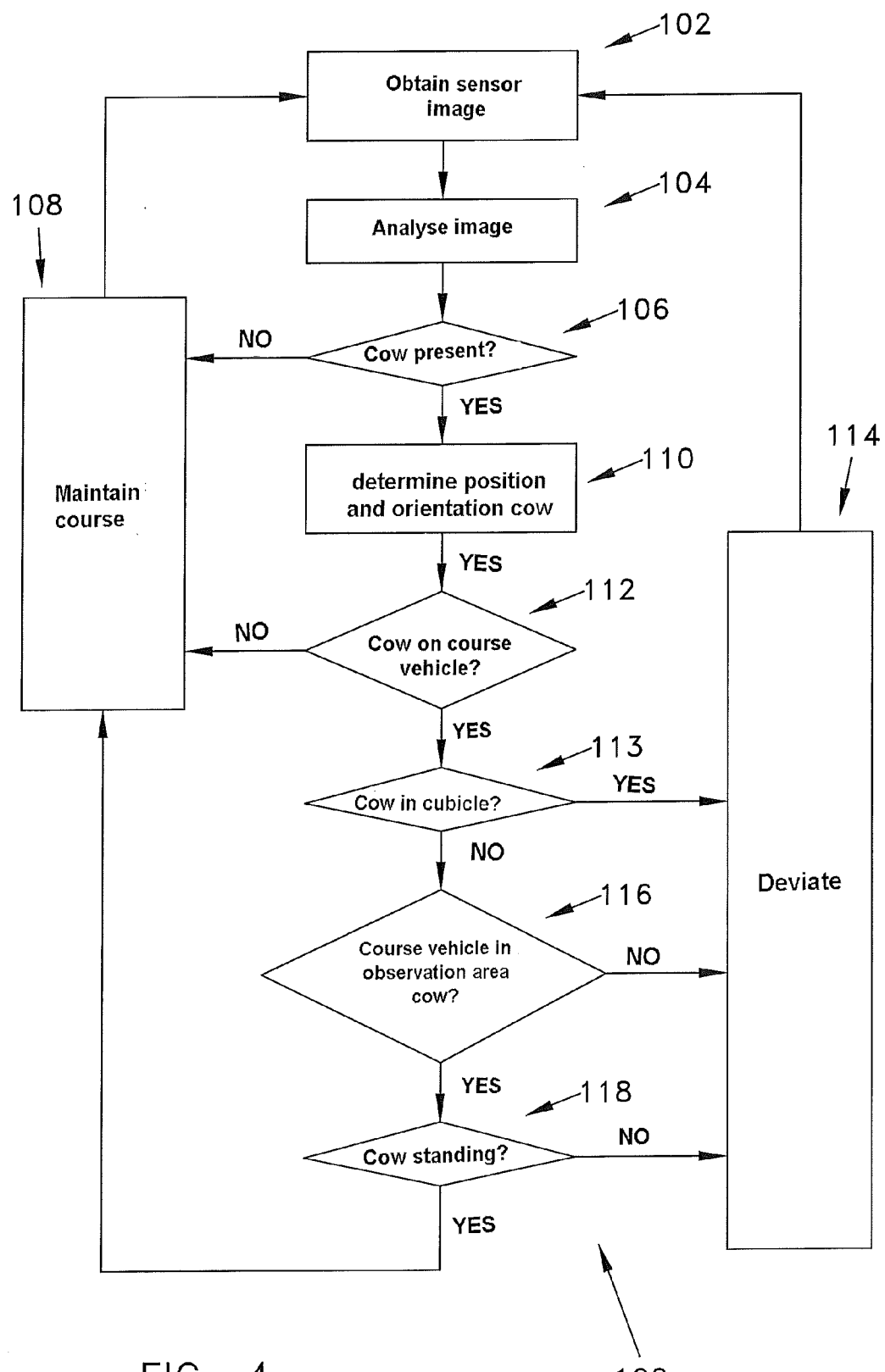
FIG. 4 is a flowchart of an embodiment of a method.

An algorithm 100 for the method according to the invention is shown in the flowchart of FIG. 4. A sensor, for example the sensor 24 of the above described unmanned vehicle, detects a part of a space, in which space animals may be present. This detection is translated into an image, for example a spatial image. This image is added to the algorithm in step 102. In step 104 the objects in the image are analysed, for example by comparing shape aspects and dimensions with reference objects in a database. An animal, such as a cow, can thus be detected. It is also detected whether the cow is lying or standing and, if desired, other characteristics, such as size and health of the cow, can be determined.

In step 106 it is detected whether a cow, or a part thereof, is present in the image. If not, the unmanned vehicle is allowed to maintain its course in step 108 and the algorithm restarts with step 102. Although the maintenance of a course is involved here, it is, of course, also possible that another part of the navigation mechanism gives an order to change the course, for reasons that have nothing to do with the presence or absence of an animal, such as a cow, but, for example, to reach a desired destination.

If a cow is indeed detected in step 104, there is subsequently determined in step 110 a part of a set of priority parameters which give an indication whether the detected animal is able to give way to the unmanned vehicle. The animal is assumed to be able to deviate if it is standing and in particular if the animal is further not completely or partially present in a cubicle and if the animal is able to detect the unmanned vehicle. In such a case the set of priority parameters in question meets a collision criterion. To determine the set of priority parameters, the position, the orientation and (in step 118) the standing condition of the cow are determined. The position of the cow can be established in absolute terms, with respect to a fixed coordinate system, or in relative terms with respect to the unmanned vehicle. By orientation is meant a direction of a forwardly oriented longitudinal axis through the cow, also herewith respect to a fixed coordinate system, or in relative terms with respect to the unmanned vehicle. The orientation can be established by determining the position of the head and/or the tail with respect to the centre of gravity of the cow. Other characteristics, such as the mutual distance of the legs and the shape of the hoofs, can be used to establish where the front side, the lateral side and the rear side of the detected cow are located.

In step 112 it is determined whether the cow is present on, or in the vicinity of, a current course of the unmanned vehicle. If this is not the case, the unmanned vehicle is allowed to maintain its course in step 108 and the algorithm restarts with step 102. If there is indeed a cow present on or near the course of the unmanned vehicle, then, on the basis of the earlier made image analysis and position determination (steps 104 and 106) it is established whether the cow is present in a cubicle (step 113). In practice, a cow can also be partially present in the cubicle. Preferably, it is established beforehand how large a part of the cow should at least be in the cubicle to decide within the context of step 113 that the cow is present in the cubicle. This part may, for example, be 25%, 50% or 75% of the cow. When the cow is in the cubicle according to step 113, the navigation mechanism receives in step 114 a command to make the unmanned vehicle deviate. A simple manner of deviating is to adjust the current course by a predetermined value, for example 15 degrees, in a predetermined direction. Of course, more complex adjustments are also possible, in which, for example, the presence of other cows, a desired destination and/or the shape of a stable are taken into account.

If the cow is not present in a cubicle, in step 116 it is determined whether the course of the unmanned vehicle is in the observation area of the cow. This is for example the case if the unmanned vehicle is currently located in front of the cow, i.e. in an area of −90 degrees to +90 degrees with respect to the longitudinal axis of the cow. In other words, the observation area is formed by the area in front of the forelegs of the animal. If desired, greater values can be selected, depending on the position of the eyes of the cow and the associated field of view. For example, the observation area may also extend from −135 degrees to +135 degrees with respect to the forwardly oriented longitudinal axis of the cow. If the course of the vehicle does not go through the observation area, the navigation mechanism receives in step 114 the command to make the unmanned vehicle deviate.

If the course of the vehicle does go through the observation area, in step 118, on the basis of the earlier made image analysis (step 104), there is established a next priority parameter, a standing condition of the detected animal, by determining whether the cow is standing. If this is the case, the set of priority parameters meets the collision criterion and the unmanned vehicle need not deviate (step 108, followed by step 102). If the cow is not standing, but lying or possibly kneeling, the navigation mechanism receives in step 114 the command to make the unmanned vehicle deviate and the algorithm restarts with step 102. The standing condition may be established by determining, on the basis of the earlier made image analysis (step 104) with how many legs the cow is standing on the ground. If the cow is standing with three or four legs on the ground, it is established that the cow is standing. If the cow is standing with zero or one leg on the ground, it is established that the cow is not standing. If the cow is standing with two legs on the ground, this can mean that the cow is kneeling and is going to lie down from a standing position, or to get up from a lying position.

In the case of a kneeling position it can optionally be established that the cow is standing or is not standing. If it is decided to equate, for the standing condition, a cow which is kneeling with a cow which is standing, the set of priority parameters meets the collision criterion if it is found from the image analysis that the cow is standing with at least two legs on the ground. Alternatively, it may be decided that the collision criterion is met if it is found from the image analysis that the cow is standing with at least three legs on the ground.

It will be obvious that the invention is not limited to the preferred embodiments of the unmanned vehicle shown in the figures and described in the foregoing and the method of navigating same, but that numerous modifications are possible within the scope of the accompanying claims. For example, the method need not go through all the above-described steps, or the method may be configured differently. Preferably, the method will at least determine if the animal is standing. In a relatively simple embodiment, the unmanned vehicle never deviates for an animal which is standing and always deviates for an animal which is not standing. Alternatively, the method may at least determine whether the animal is at least partially present in a confined area of the space, and/or whether the unmanned vehicle is travelling in the observation area of the animal. In a relatively simple embodiment, the unmanned vehicle never deviates for an animal positioned with less than a predetermined portion of its body in a confined area of the space and always deviates for an animal which is present therein. In another relatively simple embodiment, the unmanned vehicle never deviates for an animal for which the unmanned vehicle is travelling within the observation area and always deviates for an animal for which the unmanned vehicle is travelling outside the observation area.

In an alternative method, a plurality of priority parameters are determined in one go and the decision to deviate or not to deviate is made from a multidimensional matrix in which for each combination of priority parameters it is recorded whether or not it meets the collision criterion and the unmanned vehicle accordingly deviates or maintains its course.

The manure slide and the sliding shoe of the unmanned vehicle may, for example, be designed linearly. Furthermore, the sliding shoe may be detachably attached to the unmanned vehicle, so that it is possible to use the unmanned vehicle with and without sliding shoe.

An unmanned vehicle can also perform other activities, such as autonomously connecting teat cups for milking a dairy animal, such as a cow, inspecting the health of the animals, driving animals, or distributing feed. The unmanned vehicle and the associated method can also be applied in another space than a stable, such as a pasture. In said space there may also be other animals than cow, such as, for example, pigs. The navigation, as far as it is not influenced by the above-described inventive method, may have various forms and may be fed in different manners. Although it is advantageous if the unmanned vehicle selects its route on the basis of detected spatial images of the environment, the route may also be determined completely or partially by chance (fixed, or random choice of adjustment of the course direction after meeting an obstacle), or by a beforehand programmed route, for example with respect to fixed beacons, or with respect to GPS coordinates.

It is further possible to use a different type of sensor for forming an image by which an animal is detected. For example, there may be used other types of spatial sensors, such as a time-of-flight sensor, stereometric cameras, radar, or laser scanners. There may also be used a camera which forms a two-dimensional image. For, this suffices to determine whether an animal is lying on the course of the unmanned vehicle and what is the orientation of the animal. Moreover, from a two-dimensional image there can be made a distance estimation by determining the size of an image on the camera of the depicted animal. It may also be advantageous to combine different types of sensors with each other.

Thus, the invention has been described by reference to certain embodiments discussed above. It will be recognized that these embodiments are susceptible to various modifications and alternative forms well known to those of skill in the art. Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A method of navigating an unmanned vehicle in a space in which at least one animal is present, the method comprising:
   detecting at least a part of the at least one animal, and
   determining whether a current course of the unmanned vehicle will lead to a collision with the animal,
   wherein, if it is determined that the current course of the unmanned vehicle will lead to a collision with the detected animal, the method further comprises:
   determining a set of one or more priority parameters of the detected animal comprising at least a first priority parameter relating to a standing condition of the detected animal, and
   deciding, on the basis of the set of priority parameters of the detected animal, whether the course of the unmanned vehicle will be adjusted to avoid the detected animal,
   wherein the course of the unmanned vehicle will be maintained if the set of priority parameters meets a predetermined collision criterion, and the course of the unmanned vehicle will be adjusted to avoid the detected animal if the set of priority parameters does not meet the predetermined collision criterion, and
   wherein the set of priority parameters only meets the predetermined collision criterion if at least the standing condition of the detected animal is that the detected animal is standing, and wherein the set of priority parameters does not meet the predetermined collision criterion if the standing condition of the detected animal is that the detected animal is not standing.

2. The method according to claim 1, wherein the determined set of priority parameters used in the step of deciding whether the course of the unmanned vehicle will be adjusted to avoid the detected animal further comprises a relative orientation of the detected animal with respect to the unmanned vehicle,
   wherein the set of priority parameters only meets the predetermined collision criterion if at least the standing condition of the detected animal is that the detected animal is standing and
   the relative orientation of the detected animal is such that the course of the unmanned vehicle is within an observation area of the detected animal, and
   wherein the set of priority parameters does not meet the predetermined collision criterion if the standing condition of the detected animal is that the detected animal is not standing or the relative orientation of the detected animal is such that the course of the unmanned vehicle is outside the observation area of the detected animal.

3. The method according to claim 2, further comprising the step of setting the observation area to comprise at least the area in front of the forelegs of the detected animal.

4. The method according to claim 3, further comprising the step of setting the observation area to further comprise an area next to the detected animal,
   wherein the area is confined by a virtual line which extends obliquely rearwards from the head of the detected animal.

5. The method according to claim 1, wherein the determined set of priority parameters used in the step of deciding whether the course of the unmanned vehicle will be adjusted to avoid the detected animal further comprises a position of the animal with respect to the space,
   wherein the set of priority parameters only meets the predetermined collision criterion if at least the standing condition of the detected animal is that the detected animal is standing and the detected animal is positioned with less than a predetermined portion of its body in a confined area of the space, and wherein the set of priority parameters does not meet the predetermined collision criterion if the standing condition of the detected animal is that the detected animal is not standing or that the detected animal is positioned with more than a predetermined portion of its body in a confined area of the space.

6. The method according to claim 5, further comprising the step of selecting the predetermined portion is a percentage of the detected animal in a range of 0-90%.

7. The method according to claim 6, wherein the percentage is 75%, 50% or 25%.

8. An unmanned vehicle for performing activities in a space in which at least one animal is present, comprising a frame, with mounted thereon:

a propulsion mechanism and a navigation mechanism, wherein the vehicle further comprises a sensor for forming an image of an observation area, the sensor comprising a sensor image processor operatively connected to the navigation mechanism, and wherein at least one of the sensor image processor and the navigation mechanism is configured to:

detect at least a part of the at least one animal, and determine whether a current course of the unmanned vehicle will lead to a collision with the animal, wherein the at least one of sensor image processor and navigation mechanism, if the current course of the unmanned vehicle will lead to a collision with the detected animal, subsequently:

determine at least a first priority parameter from a set of one or more priority parameters of the detected animal, wherein the first priority parameter is a standing condition of the detected animal, decide, on the basis of the set of priority parameters of the detected animal, whether the course of the unmanned vehicle will be adjusted to avoid the detected animal, wherein the course of the unmanned vehicle will be maintained if the set of priority parameters meets a predetermined collision criterion, and the course of the unmanned vehicle will be adjusted to avoid the detected animal if the set of priority parameters does not meet the predetermined collision criterion, wherein the set of priority parameters only meets the predetermined collision criterion if at least the standing condition of the detected animal if that the detected animal is standing, and wherein the set of priority parameters does not meet the predetermined collision criterion if the standing condition of the detected animal is that the detected animal is not standing.

9. The unmanned vehicle according to claim 8, wherein the set of priority parameters comprises a relative orientation of the detected animal with respect to the unmanned vehicle, wherein the set of priority parameters only meets the predetermined collision criterion if at least the standing condition of the detected animal is that the detected animal is standing and the relative orientation of the detected animal is such that the course of the unmanned vehicle is within an observation area of the detected animal, and wherein the set of priority parameters does not meet the predetermined collision criterion if the standing condition of the detected animal is at least one of: that the detected animal is not standing or the relative orientation of the detected animal is such that the course of the unmanned vehicle is outside the observation area of the detected animal.

10. The unmanned vehicle according to claim 9, wherein the observation area comprises at least the area in front of the forelegs of the detected animal.

11. The unmanned vehicle according to claim 10, wherein the observation area further comprises an area next to the detected animal, wherein the area is confined by a virtual line which extends obliquely rearwards from the head of the detected animal.

12. The unmanned vehicle according to claim 8, wherein the sensor is configured to form a spatial image of the observation area.

13. The unmanned vehicle according to claim 9, wherein the sensor comprises:

a source of radiation for emitting modulated electromagnetic radiation, a receiver device for receiving electromagnetic radiation reflected by an object in the observation area, the receiver device comprising a matrix with a plurality of rows and a plurality of columns of receivers, an optical device for imaging the reflected electromagnetic radiation on the receiver device, and wherein the sensor image processor is configured to determine for each of the receivers a phase difference between the emitted electromagnetic radiation and the reflected electromagnetic radiation in order to calculate a distance from the receiver to the object.

14. The unmanned vehicle according to claim 8, wherein the set of priority parameters comprises a position of the animal with respect to the space, wherein the set of priority parameters only meets the predetermined collision criterion if at least the standing condition of the detected animal is that the detected animal is standing and the detected animal is positioned with less than a predetermined portion of its body in a confined area of the space, and wherein the set of priority parameters does not meet the predetermined collision criterion if the standing condition of the detected animal is that the detected animal is not standing or the detected animal is positioned with more than a predetermined portion of its body in a confined area of the space.

15. The unmanned vehicle according to claim 8, wherein the sensor image processor is configured to determine repeatedly at least one of: an image of the observation area, and an image of an object in the observation area.

16. The unmanned vehicle according to claim 8, wherein the sensor image processor is configured to recognize at least one of a heap of material to be removed and a leg of the animal.

17. The unmanned vehicle according to claim 16, wherein the vehicle is configured to remove material from the floor of a stable, and comprises a material remover.

\* \* \* \* \*